United States Patent
Van Schmus et al.

(10) Patent No.: US 6,543,797 B2
(45) Date of Patent: Apr. 8, 2003

(54) TORQUE ARM APPARATUS AND SUSPENSION SYSTEM

(75) Inventors: Ehren W. Van Schmus, San Luis Obispo, CA (US); Charles G. Schwynoch, San Luis Obispo, CA (US)

(73) Assignee: Maximum Motorsports, San Luis Obispo, CA (US)

( * ) Notice: Subject to any disclaimer, the term of this patent is extended or adjusted under 35 U.S.C. 154(b) by 47 days.

(21) Appl. No.: 09/904,696

(22) Filed: Jul. 13, 2001

(65) Prior Publication Data

US 2003/0011161 A1 Jan. 16, 2003

(51) Int. Cl.⁷ .............................................. B60G 21/05
(52) U.S. Cl. ............................ 280/124.104; 280/788; 180/349; 180/378
(58) Field of Search ................ 280/124.104, 124.116, 280/124.111, 788; 180/349, 352, 378

(56) References Cited

U.S. PATENT DOCUMENTS

| | | | | |
|---|---|---|---|---|
| 2,300,844 A | * | 11/1942 | Olley | 180/349 |
| 3,948,334 A | * | 4/1976 | Danielson et al. | 180/24.13 |
| 3,948,336 A | * | 4/1976 | DeFusco et al. | 180/254 |
| 4,491,341 A | * | 1/1985 | Maebayashi | 280/124.128 |
| 4,573,702 A | * | 3/1986 | Klem | 280/5.504 |
| 4,669,571 A | * | 6/1987 | Kurde | 180/348 |
| 4,705,128 A | * | 11/1987 | Krude | 180/348 |
| 4,974,697 A | * | 12/1990 | Krude | 180/348 |
| 5,064,018 A | * | 11/1991 | Encke | 180/360 |
| 5,271,294 A | * | 12/1993 | Osenbaugh | 74/607 |
| 5,358,066 A | * | 10/1994 | Shope | 180/380 |
| 5,435,592 A | * | 7/1995 | Aamodt | 280/124.116 |
| 5,758,738 A | * | 6/1998 | Carroll et al. | 180/292 |
| 5,884,723 A | * | 3/1999 | Kleinschmit et al. | 180/360 |
| 6,042,131 A | * | 3/2000 | Bailey | 280/86.75 |
| 6,390,485 B1 | * | 5/2002 | Cadden | 280/124.163 |

FOREIGN PATENT DOCUMENTS

JP 2002029235 A * 1/2002 .......... B60G/09/04

* cited by examiner

Primary Examiner—Lesley D. Morris
Assistant Examiner—Paul Royal, Jr.
(74) Attorney, Agent, or Firm—David O. Simmons

(57) ABSTRACT

An embodiment of a torque arm apparatus as disclosed herein includes a torque arm beam member and a plurality of axle tube support members. The torque arm beam member has a first end, a second end, a first side and a second side. Each one of the axle tube support members is attached at a respective first end thereof to the torque arm beam member adjacent to the first end of the torque arm beam member. Each one of the axle tube support members includes an axle tube mounting flange attached to a respective second end thereof. The axle tube mounting flange of a first one of the axle tube support members and the axle tube mounting flange of a second one of the axle tube support members are positioned adjacent to the first side and the second side, respectively, of the torque arm beam member.

27 Claims, 7 Drawing Sheets

TORQUE ARM APPARATUS AND SUSPENSION SYSTEM

FIELD OF THE DISCLOSURE

The disclosures herein relate generally to automobile suspensions and more particularly to a torque arm apparatus and suspension system.

BACKGROUND OF THE DISCLOSURE

A rear suspension having a solid axle housing (also referred to herein as the axle housing) requires one or more members for controlling rotation of the axle. A solid axle housing is also often referred to as a live axle. Under acceleration and deceleration, forces are exerted on the solid axle housing that would cause the solid axle housing to rotate about its longitudinal axis.

In one suspension arrangement, the solid axle housing is mounted on a chassis via two control arms and a torque arm apparatus. The torque arm apparatus and the control arms mount between the solid axle housing and the chassis of a vehicle. The torque arm apparatus controls rotation of the solid axle housing. Effectively, the torque arm apparatus limits rotation of the solid axle housing about the longitudinal axis of the solid axle housing. Specifically, the torque arm apparatus permits the solid axle housing to rotate about a centerline axis of the torque arm apparatus and to translate about a curved reference axis jointly defined by the torque arm apparatus and the control arms.

A torque arm apparatus having a conventional construction suffers from one or more drawbacks. A torque arm apparatus having a conventional construction is referred to herein as a conventional torque arm apparatus. Conventional torque arm assemblies are offered by Griggs Racing and Global West. Examples of drawbacks associated with a conventional torque arm apparatus includes, but are not limited to, excessively reduced ground clearance, inability or limited ability to adjust the pinion angle, the centerline of the torque arm apparatus being offset from a vertical plane extending through the centerline of the solid axle housing and limited strength at one or more mounting points of the torque arm apparatus. These limitations reduce the effectiveness and versatility of a conventional torque arm apparatus.

Accordingly, a torque arm apparatus and/or suspension system capable of overcoming these drawbacks is useful.

DETAILED DESCRIPTION

Embodiments of a torque arm apparatus as disclosed herein provide a number of benefits over conventional torque arm apparatuses. For example, relative to conventional torque arm apparatuses, embodiments of the torque arm apparatus disclosed herein provide increased ground clearance, differential cover access, pinion angle adjustability, a centerline mounting of the torque arm apparatus and increased mounting point strength. These benefits increase the effectiveness, reliability and versatility of embodiments of the torque arm apparatus disclosed herein.

Figure 1:
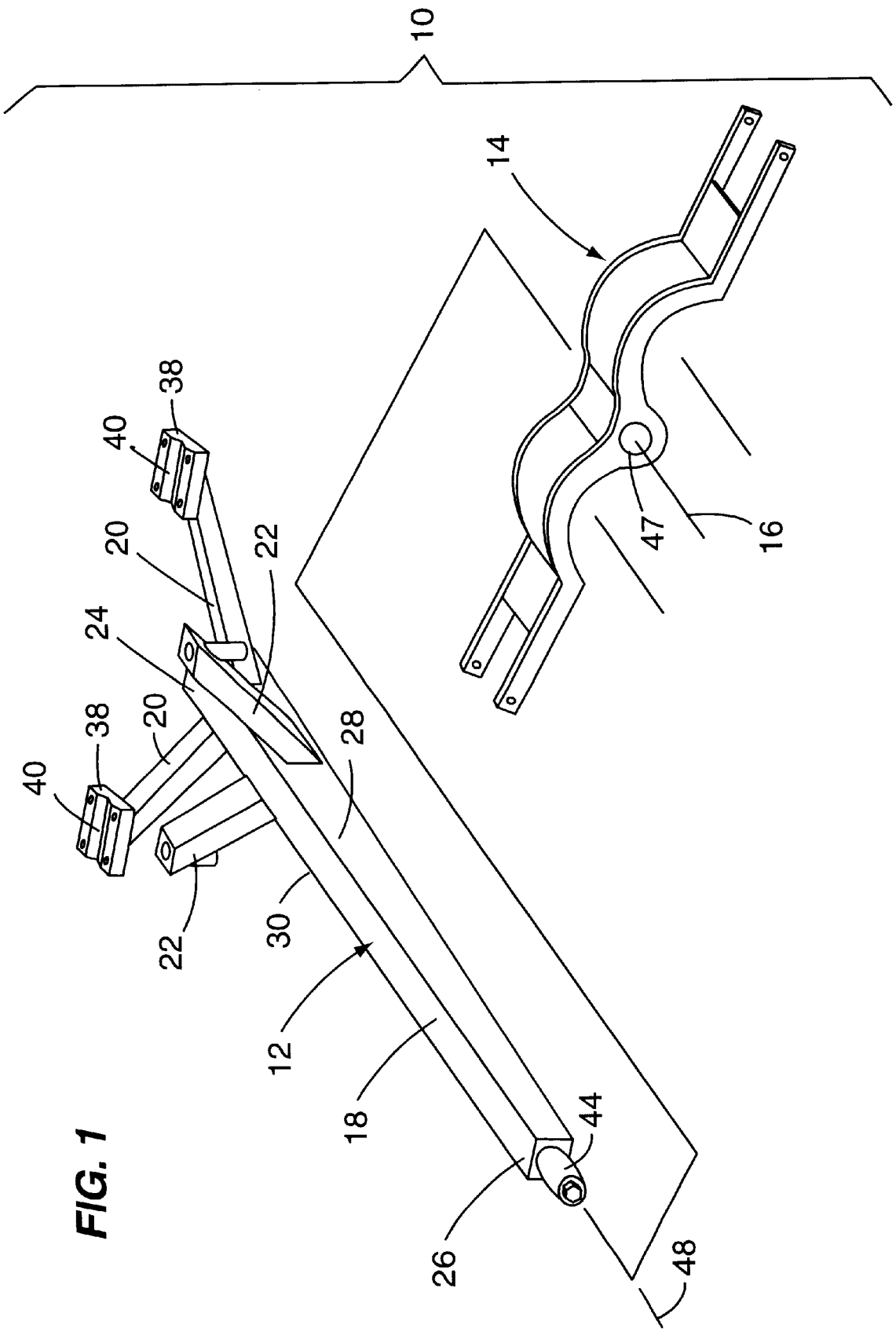
FIG. 1 is a exploded perspective view depicting an embodiment of a torque arm apparatus as disclosed herein.

FIG. 1 depicts an embodiment of a torque arm apparatus 10 as disclosed herein. The torque arm apparatus 10 includes a torque arm assembly 12 and a cross member assembly 14. The torque arm assembly 12 is capable of being attached between a solid axle housing and the cross member assembly 14. The torque arm assembly 12 is attached to the cross member assembly 14 in a manner permitting the torque arm assembly 12 to translate along and to rotate about a central axis 16 of the cross member assembly 14.

Figure 2:
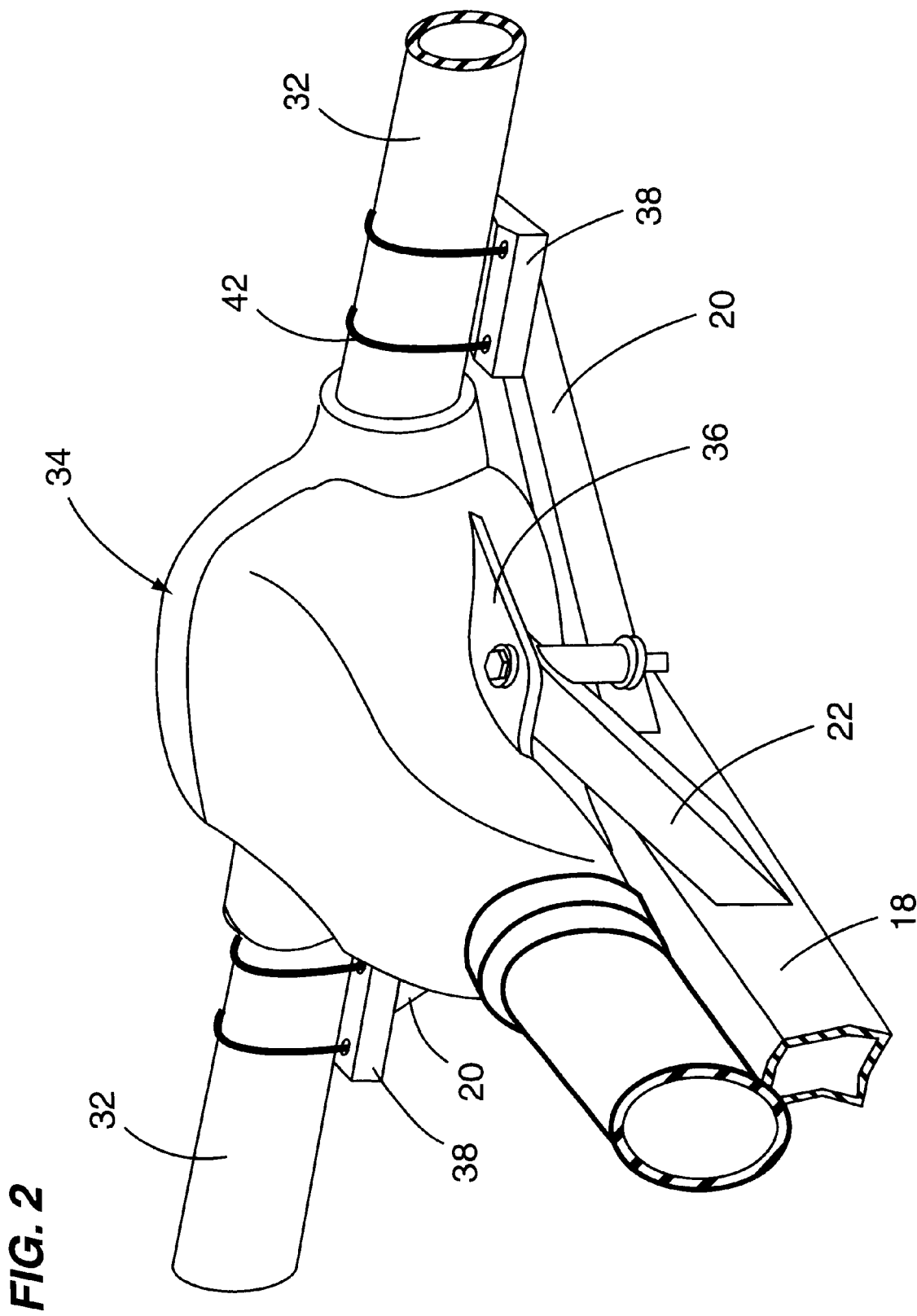
FIG. 2 is a fragmentary perspective view depicting the torque arm apparatus of FIG. 1 attached to a solid axle housing.

Referring to FIGS. 1 and 2, the torque arm assembly 12 includes a main beam 18, a plurality of axle tube support members 20 and a plurality of differential housing support members 22 attached thereto. Each one of the axle tube support members 20 and each one of the differential housing support members 22 are attached at a respective first end thereof to the main beam 18. Each one of the axle tube support members 20 is attached to the main beam 18 adjacent to a first end 24 of the main beam 18. Each one of the differential housing support members 22 is attached to the main beam 18 at a position between the first end 24 and a second end 26 of the main beam 18.

A first one of the axle tube support members 20 and a first one of the differential housing support members 22 are attached to a first side 28 of the main beam 18. A second one of the axle tube support members 20 and a second one of the differential housing support members 22 are attached to a second side 30 of the main beam 18. It is contemplated herein that the first one and the second one of the axle tube support members 20 may be attached to a rear face of the torque arm beam member 18.

Each one of the axle tube support members 20 is attached adjacent to a respective second end thereof to a corresponding axle tube 32, FIG. 2, of the solid axle housing 34. Accordingly, access for removal and attachment of a differential cover of the axle housing assembly is not precluded with the torque arm assembly 12 attached to the solid axle housing 34. Such access is advantageous relative to conventional torque arm assemblies that do not provide such access.

Each one of the differential housing support members 22 is attached adjacent to a respective second end thereof to a corresponding differential flange 36. A harmonic damper mounting flange is an example of the differential flange 36. Harmonic damper mounting flanges are often integrally attached to the differential housing of a solid axle housing.

Each one of the axle tube support members 20 has a respective axle tube mounting flange 38 attached to the respective second end thereof. In at least one embodiment of the axle tube mounting flange 38, the axle tube mounting flange 38 has a cradle-shaped surface 40, FIG. 1, for having the corresponding axle tube 32 mounted thereon. A substantially V-shaped surface and a substantially U-shaped surface are examples of the cradle-shaped surface 40. An axle tube fastening member 42, FIG. 2, such as a U-shaped bolt, is attached around each axle tube 32 and to each axle tube mounting flange 38.

Figure 3:
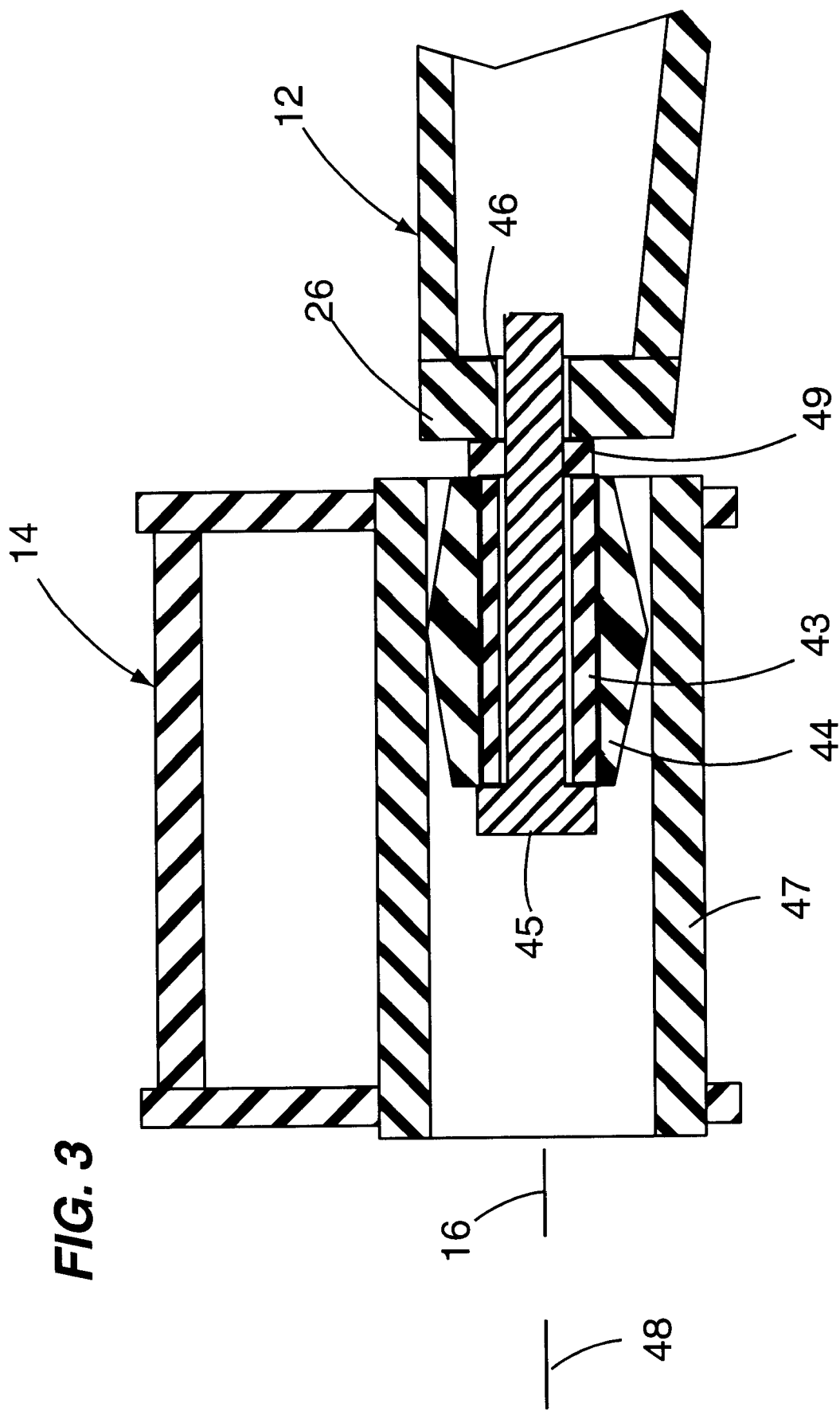
FIG. 3 is a cross-sectional view depicting an embodiment of a connection arrangement between a cross member assembly and a torque arm assembly as disclosed herein.

Referring to FIGS. 1 and 3, the torque arm assembly 12 includes a bushing member 44 mounted on the torque arm member 18 at the second end 26 thereof. A sleeve 43 extends through the bushing member 44 and a threaded fastener 45 extends through the sleeve 43. A metal tube is an example of the sleeve 43 and a bolt is am example of the threaded fastener 45. The threaded fastener 45 is received in a mating threaded hole 46 of the torque arm beam member 18. The sleeve 43 allows the threaded fastener 45 to be tightened to a required level of tightness without exerting any significant force on the bushing member 44.

The cross member assembly 14 includes a bushing member receptacle 47. The bushing member 44 defines a longitudinal axis 48 thereof extending generally parallel to a longitudinal axis of the torque arm beam member 18. The bushing member 44 is positioned in the bushing member receptacle 47. One or more spacers 49 are used for adjusting the axial position of the bushing member 44 with respect to the bushing member receptacle 47.

The bushing member 44 and the bushing member receptacle 47 are configured such that the longitudinal axis 48 of the bushing member 44 is approximately aligned with the central axis 16 of the cross member assembly 14. Accordingly, the torque arm assembly 12 is capable of translating along and rotating about the central axis 16 of the cross member assembly 14. A cylindrical sleeve is an example of the bushing member receptacle 47. A cylindrical bushing having a barrel-shaped receptacle engagement surface is an example of the bushing member 44. It is contemplated herein that the bushing member 44 may be made from a commercially available polymeric material such as graphite-impregnated polyurethane or a DELRIN-brand polymeric material.

Figure 4:
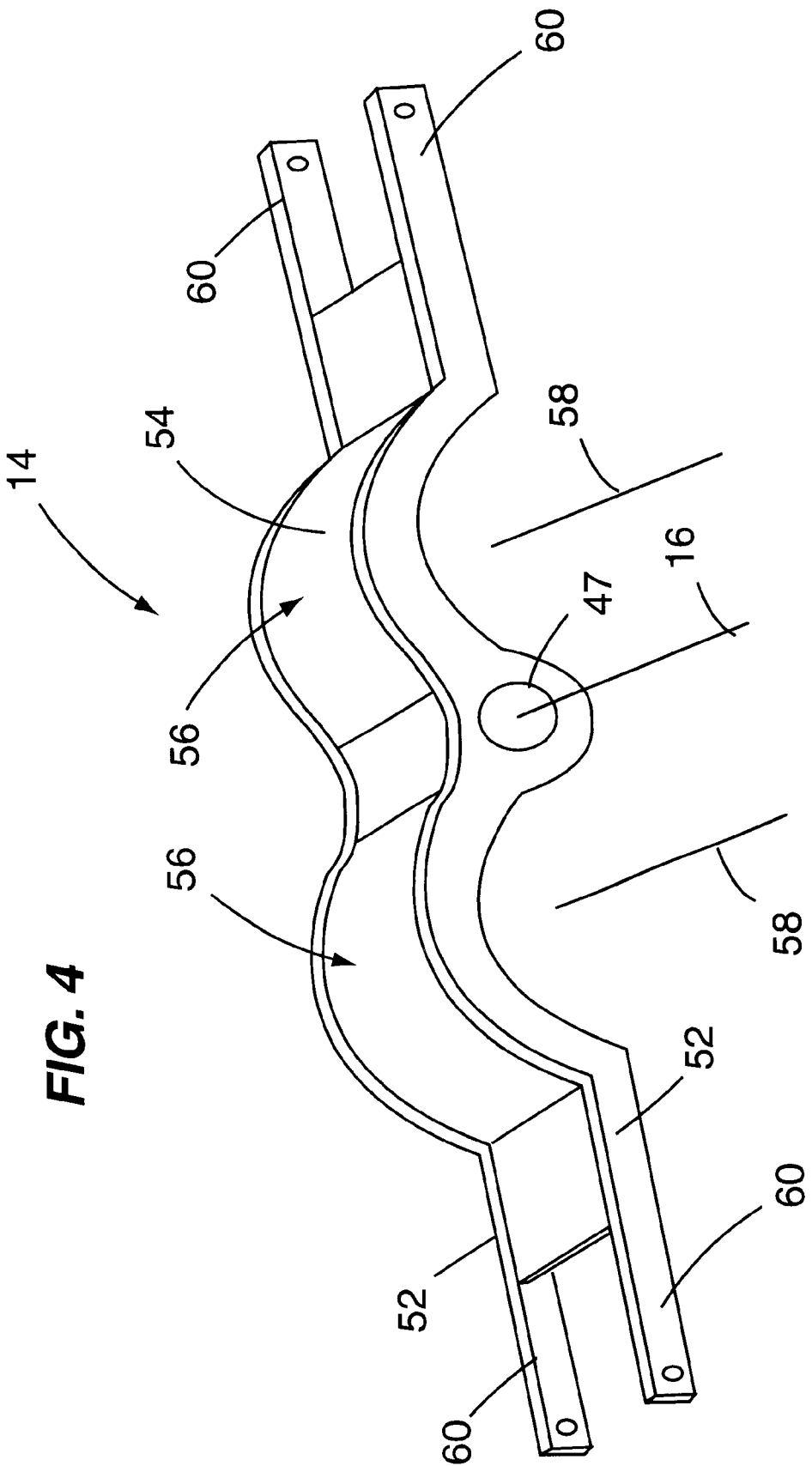
FIG. 4 is a perspective view of the cross member assembly depicted in FIG. 1.

Referring to FIG. 4, the cross member assembly 14 includes two spaced-apart face plates 52 having one or more gussets 54 attached therebetween. It is contemplated herein that the cross member assembly 14 may include one gusset 54 having appropriate contour and extending approximately the entire length of each one of the face plates 52. It is also contemplated herein that the cross member apparatus 14 may include one or more flat and/or contoured gussets 54.

The two spaced-apart face plates 52 are shaped for defining two side-by-side arched segments 56. The bushing member receptacle 47 is positioned between the two side-by-side arched segments 56 wherein a longitudinal axis 58 of each one of the arched segments 56 extends generally parallel to the central axis 16 of the cross member assembly 14.

Figure 5:
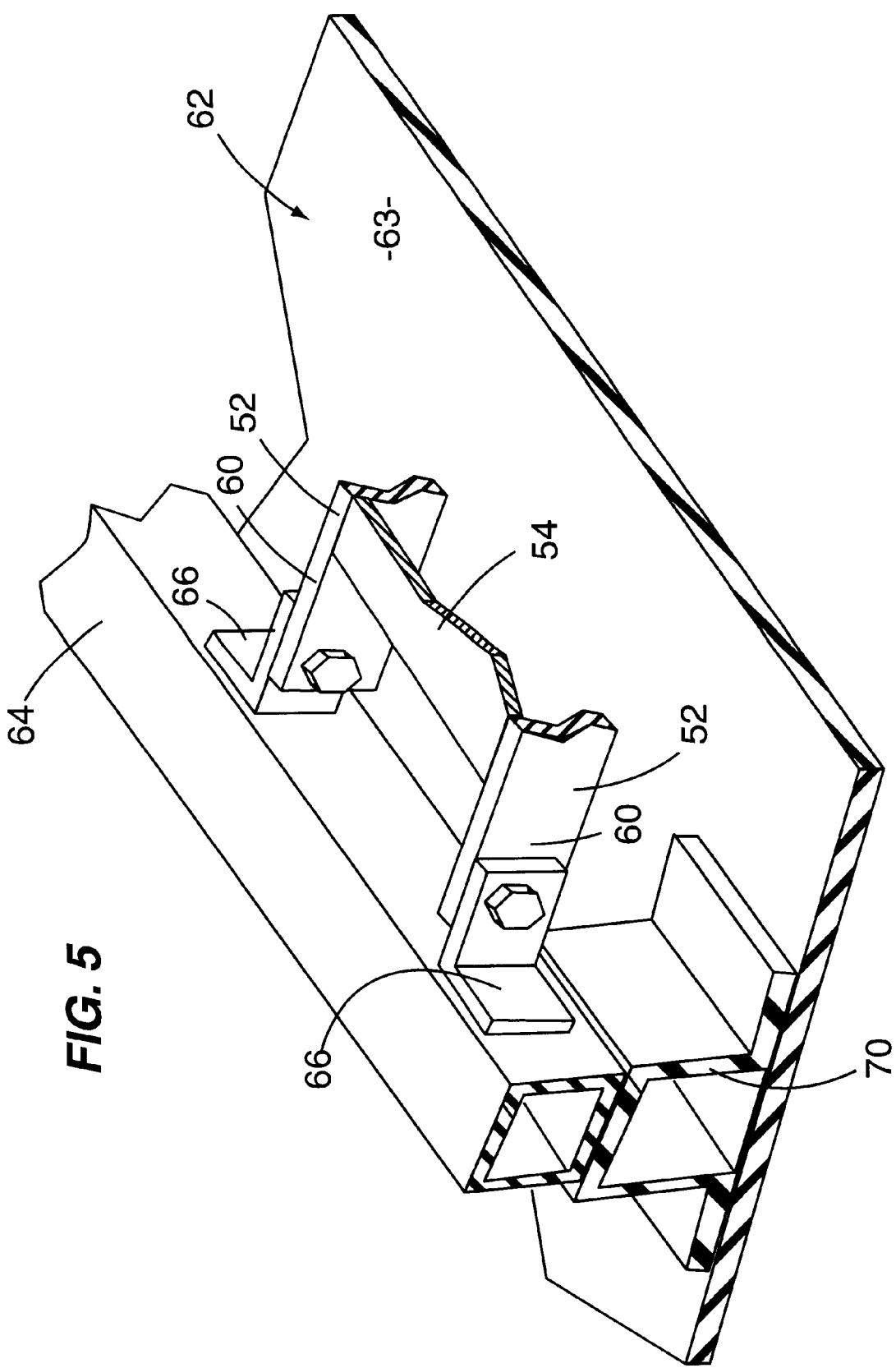
FIG. 5 is a fragmentary perspective view depicting an embodiment of an attachment arrangement between the cross member depicted in FIG. 4 and an add-on sub-frame connector.
Figure 6:
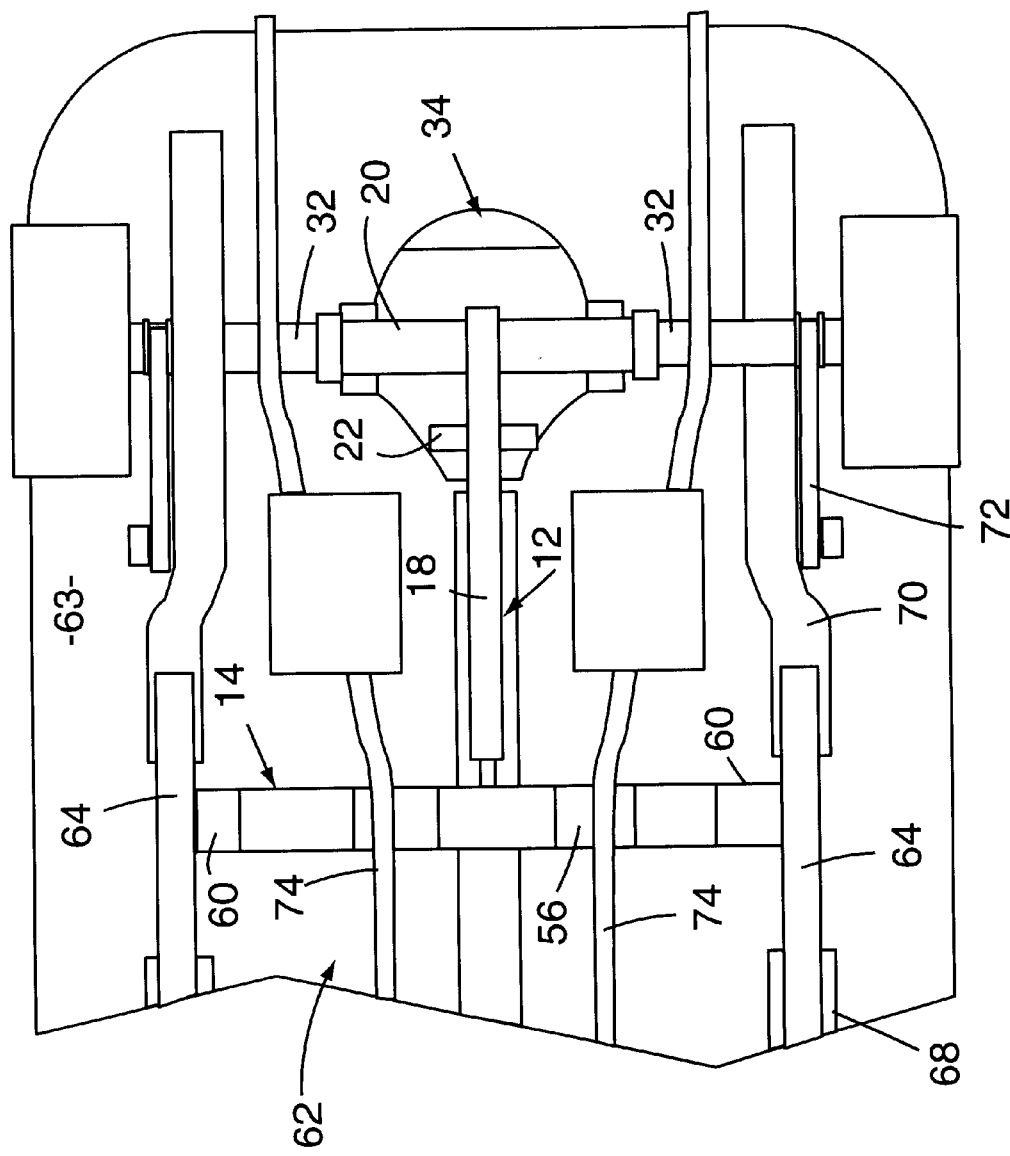
FIG. 6 is a bottom view of a vehicle chassis having a torque arm apparatus as disclosed herein attached thereto.

Referring to FIGS. 5 and 6, chassis-mounting members 60 are provided at opposing ends of each one of the face plates 52. In at least one embodiment of the chassis-mounting members 60, the chassis-mounting members 60 are integrally formed with the respective one of the face plates 52. The chassis-mounting members 60 are capable of enabling the cross member assembly 14 to be attached to a vehicle chassis 62.

In at least one embodiment of the vehicle chassis 62, the vehicle chassis includes floor pan 63 and add-on (i.e. added by the owner of the vehicle) spaced-apart sub-frame members 64. Mounting tabs 66, FIG. 5, are attached to the sub-frame connectors 64 such as by welding. It is contemplated herein that the mounting tabs 66 may be configured for being attached to round sub-frame connectors, rectangular sub-frame connectors or both. The chassis-mounting members 60 are attached to the mounting tabs 66 such as by threaded fasteners or welding. It is also contemplated herein that the chassis-mounting members 60 may be configured for being attached directly to the vehicle chassis 62.

The add-on sub-frame connectors 64 are typically attached to (e.g. welded) between the front frame rails 68 and rear frame rails 70 of the vehicle chassis 62. The sub-frame connectors 64 increase rigidity of the vehicle chassis 62. Add-on sub-frame connectors for various vehicles are commercially-available from a number of manufacturers and distributors. For example, add-on sub-frame connectors for most late-model Ford-brand Mustangs are available from Maximum Motorsports, Griggs Racing, Steeda Autosports and other manufacturers and distributors.

As depicted in FIG. 6, the solid axle housing 34 is mounted on the vehicle chassis 62 via two control arms 72. The control arms 72 are each pivotally attached at a respective first end thereof to the vehicle chassis (e.g. at the rear frame rails 70) and are pivotally attached at a respective second end thereof to the solid axle housing 34. The torque arm assembly 12 is preferably position equidistant between the two control arms 72. The cross member assembly 14 is attached between the sub-frame connectors 64. The torque arm assembly 12 is fixedly attached to the solid axle housing 34 and is movably attached to the cross member assembly 14, as disclosed above.

Each one of the arched segments 56 of the cross member assembly 14 are positioned for being aligned with a corresponding exhaust pipe 74 of a vehicle exhaust system. Each one of the arch segments 56 is positioned between the corresponding exhaust pipe 74 and the vehicle chassis 62. In this manner, embodiments of cross members having arched segments provide additional clearance for the vehicle exhaust system relative to cross member assembly without arched segments. Furthermore, such positioning provides additional ground clearance relative to the cross member assembly 14.

The orientation of the torque arm beam member 18 and the cross member 14 permits centerline mounting of the torque arm assembly 12. By centerline mounting, it is meant that a centerline 16 of the cross member and a longitudinal axis 48 of the torque arm beam member 18 are approximately aligned with a vertical plane extending through a centerline of the solid axle housing 34. This orientation is advantageous, as the loads and suspension geometry associated with the torque arm apparatus 10 are approximately balance relative to the centerline of the solid axle housing 34.

The torque arm assembly 12 facilitates pinion angle adjustment in a manner that does not compromise mounting point strength of the torque arm assembly 12. To adjust pinion angle of the solid axle housing 34, shims 75 (e.g. washers) are positioned between each differential flange 36 and the corresponding ones of the differential housing support member 22. The additional of the shims 75 requires that the torque arm assembly 12 rotate relative to a longitudinal axis of the axle tubes 32.

The torque arm assembly 18 disclosed herein permits the axle tubes 32 to rotate on the cradle-shaped surface 40 of each one of the axle tube mounting flanges 38. Such rotation of the torque arm assembly 12 results in changes in the pinion angle. In response to rotating the torque arm assembly 12 relative to the axle tubes 32, a contact surface of each differential flange 36 and a contact surface of the differential housing support member 22 are generally not parallel. Manufacturing tolerances also contribute to misalignment between the contact surface of each differential flange 36 and the contact surface of the differential housing support member 22.

Figure 7:
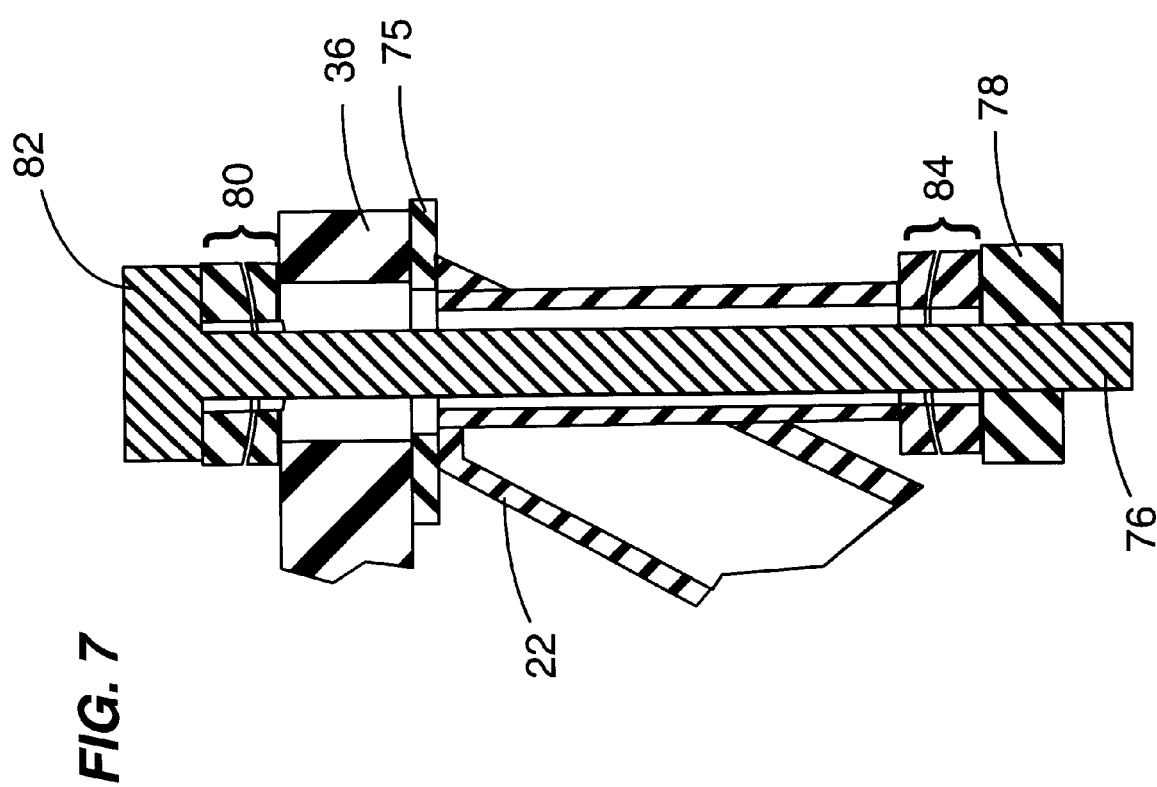
FIG. 7 is a cross-sectional view depicting an embodiment of an attachment arrangement between the differential housing support member depicted in FIGS. 1 and 2 and a differential flange.

As depicted in FIG. 7, a bolt 76 and nut 78 secure each differential housing support member 22 to each differential flange 36. A first spherical washer 80 is positioned between a head 82 of the bolt 76 and the differential flange 36. A second spherical washer 84 is positioned between the nut 78 and the differential housing support member 22. The first and the second spherical washers 80, 84 each include a convex washer portion and a concave washer portion. The convex washer portion has a convex surface that engages a concave surface of the concave washer portion. Accordingly, the concave washer portion and the convex washer portion can translate relative to each other.

The spherical washers 80, 84 eliminate bending loads in each bolt 76 when clamping two non-parallel structures together (i.e. each differential flange 36 and the corresponding differential housing support member 22). The use of the spherical washers 84 aid in providing uniform distribution of loads on the head 82 of the bolt 76 and on the nut 78. Accordingly, the attachment strength between the differential flange 36 and the differential housing support member 22 is increased relative to flat washers.

The torque arm assembly 12 provides increased ground clearance relative to conventional torque arm assemblies. The torque arm beam member 18 is capable of being positioned in close proximity to the differential housing of the solid axle housing 34 because of the conforming shape of the beam which matches the bottom of the axle housing. Accordingly, for a given construction of the torque arm beam member 18, ground clearance is enhanced and maximum strength is retained.

The torque arm assembly 12 and the cross member assembly 14 may be made from commercially available materials and fabricated using known processes. Examples of commercially available materials include steel plate, sheet, tube and pipe materials. Examples of known processes include cutting, welded, punching, blanking, turning, drilling, tapping, milling, laser cutting, water jet cutting, plating, powder coating and the like.

One embodiment of a torque arm apparatus as disclosed herein includes a torque arm beam member and a plurality of axle tube support members. The torque arm beam member has a first end, a second end, a first side and a second side. Each one of the axle tube support members is attached at a respective first end thereof to the torque arm beam member adjacent to the first end of the torque arm beam member. Each one of the axle tube support members includes an axle tube mounting flange attached to a respective second end thereof. The axle tube mounting flange of a first one of the axle tube support members and the axle tube mounting flange of a second one of the axle tube support members are positioned adjacent to the first side and the second side, respectively, of the torque arm beam member.

Another embodiment of a torque arm apparatus as disclosed herein includes a torque arm beam member and a plurality of axle tube support members. The torque arm beam member has a first end, a second end, a first side and a second side. Each one of the axle tube support members is attached at a respective first end thereof to the torque arm beam member adjacent to the first end of the torque arm beam member. Each one of the axle tube support members includes an axle tube mounting flange attached to a respective second end thereof. The axle tube mounting flange of a first one of the axle tube support members and the axle tube mounting flange of a second one of the axle tube support members are positioned adjacent to the first side and the second side, respectively, of the torque arm beam member. The torque arm apparatus further includes a plurality of differential housing support members, a cylindrical bushing member and a cross member assembly. Each one of the differential housing support members is attached at a respective first end thereof to the torque arm beam member between the first and the second ends of the torque arm beam member. A first one of the differential housing support members and a second one of the differential housing support members are attached to the first side and the second side, respectively, of the torque arm beam member. The cylindrical bushing member is attached to the torque arm beam member at a second end thereof. A longitudinal axis of the cylindrical bushing member extends generally parallel to a longitudinal axis of the torque arm beam member. The cross member assembly extends generally perpendicular to the longitudinal axis of the torque arm beam member and includes a bushing member receptacle having the cylindrical bushing member mounted therein. The cylindrical bushing member is capable of translating along and rotating about a longitudinal axis of the bushing member receptacle.

An embodiment of a torque arm suspension system as disclosed herein includes a vehicle chassis, two spaced-apart installer-provided sub-frame connectors attached to the vehicle chassis and a solid axle housing including two axle tubes having differential housing attached therebetween. The differential housing includes a first vibration damper mounting flange attached thereto adjacent to a first one of the axle tubes and a second vibration damper mounting flange attached thereto adjacent to a second one of the axle tubes. A pair of control arms are each pivotally attached at a respective first end thereof to the vehicle chassis and are pivotally attached at a respective second end thereof to the solid axle housing. An elongated cross member assembly is attached between the installer-provided sub-frame connectors. A torque arm assembly is fixedly attached to the solid axle housing and is movably attached to the cross member assembly. The torque arm assembly includes a first axle tube support member attached to a first one of the axle tubes and a second axle tube support member attached to a second one of the axle tubes. Each one of the axle tube support members is attached at a respective first end thereof to a torque arm beam member adjacent to a first end of the torque arm beam member and includes an axle tube mounting flange attached to a respective second end thereof.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A torque arm apparatus, comprising:
   a torque arm beam member having a first end, a second end, a first side and a second side; and
   a plurality of axle tube support members, each one of said axle tube support members attached at a respective first end thereof to the torque arm beam member adjacent to the first end of the torque arm beam member and including an axle tube mounting flange attached to a respective second end thereof, wherein the axle tube mounting flange of a first one of said axle tube support members and the axle tube mounting flange of a second one of said axle tube support members are positioned adjacent to the first side and the second side, respectively, of the torque arm beam member.

2. The torque arm apparatus of claim 1 wherein:
   the first one of said axle tube support members is attached at the respective first end thereof to the first side of the torque arm beam member; and
   the second one of said axle tube support members is attached at the respective first end thereof to the second side of the torque arm beam member.

3. The torque arm apparatus of claim 1 wherein a respective second end of each one of the axle tube mounting members includes an axle tube mounting flange having cradle-shaped surface for receiving a corresponding axle tube of a solid axle housing thereon.

4. The torque arm apparatus of claim 3 wherein the cradle-shaped surface is substantially V-shaped.

5. The torque arm apparatus of claim 3 wherein the cradle-shaped surface is substantially U-shaped.

6. The torque arm apparatus of claim 1, further comprising:
   an axle tube fastening member attached to each one of the axle tube mounting members.

7. The torque arm apparatus of claim 6 wherein each axle tube fastening member is a u-shaped bolt.

8. The torque arm apparatus of claim 1, further comprising:
   a plurality of differential housing support members, each one of said differential housing support members attached at a respective first end thereof to the torque arm beam member between the first and the second ends of the torque arm beam member, a first one of said differential housing support members and a second one of said differential housing support members are attached to the first side and the second side, respectively, of the torque arm beam member.

9. The torque arm apparatus of claim 8 wherein:
   the first one of said differential housing support members is attached at the respective first end thereof to the first side of the torque arm beam member; and
   the second one of said differential housing support members is attached at the respective first end thereof to the second side of the torque arm beam member.

10. The torque arm apparatus of claim 1, further comprising:
    a cylindrical bushing member attached to the torque arm beam member at a second end thereof, wherein a longitudinal axis of the cylindrical bushing member extends generally parallel to a longitudinal axis of the torque arm beam member.

11. The torque arm apparatus of claim 10 wherein the cylindrical bushing member has a barrel shaped receptacle engagement surface.

12. The torque arm apparatus of claim 11 wherein the cylindrical bushing member is mounted on a face at the second end of the torque arm beam member.

13. The torque arm apparatus of claim 10, further comprising:
    an cross member assembly extending generally perpendicular to the longitudinal axis of the torque arm beam member and including a bushing member receptacle having the cylindrical bushing member mounted therein, wherein the cylindrical bushing member is capable of translating along and rotating about a longitudinal axis of the bushing member receptacle.

14. The torque arm apparatus of claim 13 wherein the bushing member receptacle is a cylindrical tube.

15. The torque arm apparatus of claim 13 wherein:
    the cross member assembly includes two side-by-side arched segments; and
    the bushing member receptacle is positioned between the two side-by-side arched segments.

16. A torque arm apparatus, comprising:
    an torque arm beam member having a first end, a second end, a first side and a second side;
    a plurality of axle tube support members, each one of said axle tube support members attached at a respective first end thereof to the torque arm beam member adjacent to the first end of the torque arm beam member and including an axle tube mounting flange attached to a respective second end thereof, wherein the axle tube mounting flange of a first one of said axle tube support members and the axle tube mounting flange of a second one of said axle tube support members are positioned adjacent to the first side and the second side, respectively, of the torque arm beam member;
    a plurality of differential housing support members, each one of said differential housing support members attached at a respective first end thereof to the torque arm beam member between the first and the second ends of the torque arm beam member, wherein a first one of said differential housing support members and a second one of said differential housing support members are attached to the first side and the second side, respectively, of the torque arm beam member;
    a cylindrical bushing member attached to the torque arm beam member at a second end thereof, wherein a longitudinal axis of the cylindrical bushing member extends generally parallel to a longitudinal axis of the torque arm beam member; and
    an cross member assembly extending generally perpendicular to the longitudinal axis of the torque arm beam member and including a bushing member receptacle having the cylindrical bushing member mounted therein, wherein the cylindrical bushing member is capable of translating along and rotating about a longitudinal axis of the bushing member receptacle.

17. A torque arm suspension system, comprising:
    a chassis;
    two spaced-apart installer-provided sub-frame connectors attached to the chassis;
    a solid axle housing including two axle tubes having differential housing attached therebetween, the differential housing including a first vibration damper mounting flange attached thereto adjacent to a first one of said axle tubes and a second vibration damper mounting flange attached thereto adjacent to a second one of said axle tubes;
    a pair of control arms each pivotally attached at a respective first end thereof to the chassis and pivotally attached at a respective second end thereof to the solid axle housing;

an elongated cross member assembly attached between said installer-provided sub-frame connectors; and a torque arm assembly fixedly attached to the solid axle housing and movably attached to the cross member assembly, the torque arm assembly including a first axle tube support member attached to a first one of said axle tubes and a second axle tube support member attached to a second one of said axle tubes, each one of said axle tube support members attached at a respective first end thereof to a torque arm beam member adjacent to a first end of the torque arm beam member and including an axle tube mounting flange attached to a respective second end thereof.

18. The torque arm suspension system of claim 17 wherein:

the first one of said axle tube support members is attached at the respective first end thereof to a first side of the torque arm beam member; and the second one of said axle tube support members is attached at the respective first end thereof to a second side of the torque arm beam member.

19. The torque arm suspension system of claim 17 wherein each one of the axle tube mounting flanges includes a cradle-shaped surface having a corresponding one of said axle tubes positioned thereon.

20. The torque arm suspension system of claim 19 wherein the cradle-shaped surface is substantially V-shaped.

21. The torque arm suspension system of claim 19 wherein the cradle-shaped surface is substantially U-shaped.

22. The torque arm suspension system of claim 17, further comprising:

an axle tube fastening member attached to each one of the axle tube mounting flanges and engaged with a corresponding one of said axle tubes.

23. The torque arm suspension system of claim 22 wherein the axle tube fastening member is a u-shaped bolt.

24. The torque arm suspension system of claim 17 wherein the torque arm assembly includes:

a first differential housing support member attached to the first vibration damper mounting bracket of the differential housing; and a second differential housing support member attached to the second vibration damper mounting bracket of the differential housing.

25. The torque arm suspension system of claim 17 wherein:

the torque arm assembly includes a cylindrical bushing member attached at a second end thereof;

the cross member assembly includes a bushing member receptacle attached thereto; and the cylindrical bushing member of the torque arm assembly is positioned in the bushing member receptacle and capable of translating along and rotating about a longitudinal axis of the bushing member receptacle.

26. The torque arm suspension system of claim 25 wherein the cylindrical bushing member has a barrel shaped exterior major surface.

27. The torque arm suspension system of claim 25, wherein:

the cross member assembly includes two side-by-side arched segments; and the bushing member receptacle is positioned between the two side-by-side arched segments.

* * * * *